United States Patent [19]

McVeigh

[11] 4,034,565
[45] July 12, 1977

[54] METHOD AND APPARATUS FOR GENERATING POWER

[76] Inventor: Charles E. McVeigh, 107 W. 9th St., Lacon, Ill. 61540

[21] Appl. No.: 529,789

[22] Filed: Dec. 16, 1974

[51] Int. Cl.$^2$ .......................................... F03C 1/00
[52] U.S. Cl. .................................. 60/503; 60/505; 60/506; 60/507
[58] Field of Search ............................. 60/495–507; 417/333, 331, 337

[56] References Cited

U.S. PATENT DOCUMENTS

| 859,396 | 7/1907 | Lynch | 60/502 |
|---|---|---|---|
| 921,637 | 5/1909 | Vanderslice | 60/503 |
| 969,665 | 9/1910 | Shinn | 60/505 |
| 3,259,361 | 7/1966 | Cantu | 60/505 |

FOREIGN PATENT DOCUMENTS

| 515,163 | 3/1921 | France | 60/502 |
|---|---|---|---|
| 16,511 | 7/1914 | United Kingdom | 60/497 |
| 17,784 | 9/1899 | United Kingdom | 60/502 |
| 307,681 | 3/1929 | United Kingdom | 60/497 |

Primary Examiner—Allen M. Ostrager
Attorney, Agent, or Firm—Bernard L. Kleinke

[57] ABSTRACT

A method and apparatus for generating power includes providing at least one elongated chamber having a float reciprocatively mounted therewithin for axial and reciprocative movement and having at least one opening in the chamber, and disposing vertically the chamber in an intermediate portion of a constantly downwardly flowing body of water between an upper-elevational portion thereof and a lower-elevational portion thereof with the opening in the chamber communicating with the water. The flow of water is alternatingly interrupted and permitted to enter the chamber via its opening to cause the float to be carried by the water in the chamber reciprocatively upwardly and downwardly within the chamber, and the reciprocative movement of the float is utilized by, for example, converting the reciprocative motion to rotational motion for driving an electrical generator.

6 Claims, 13 Drawing Figures

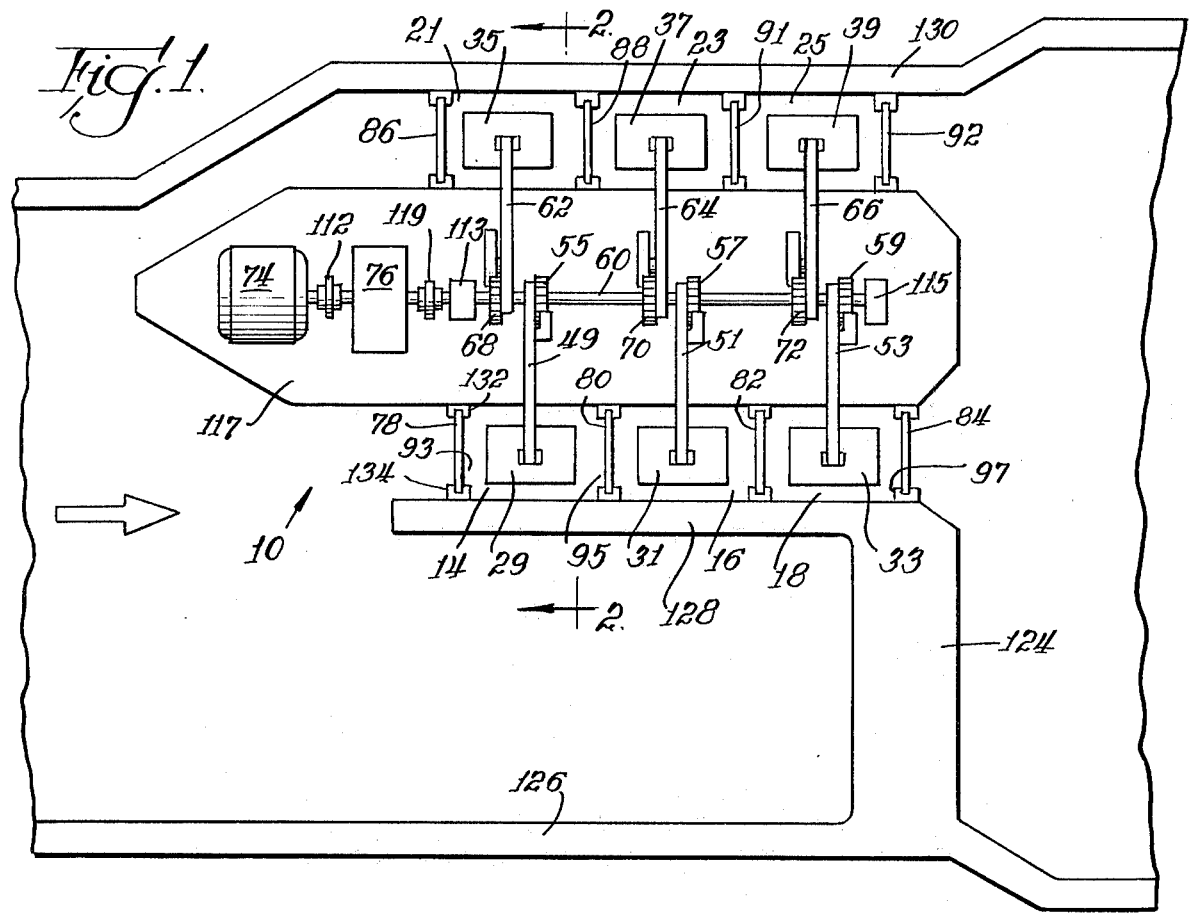
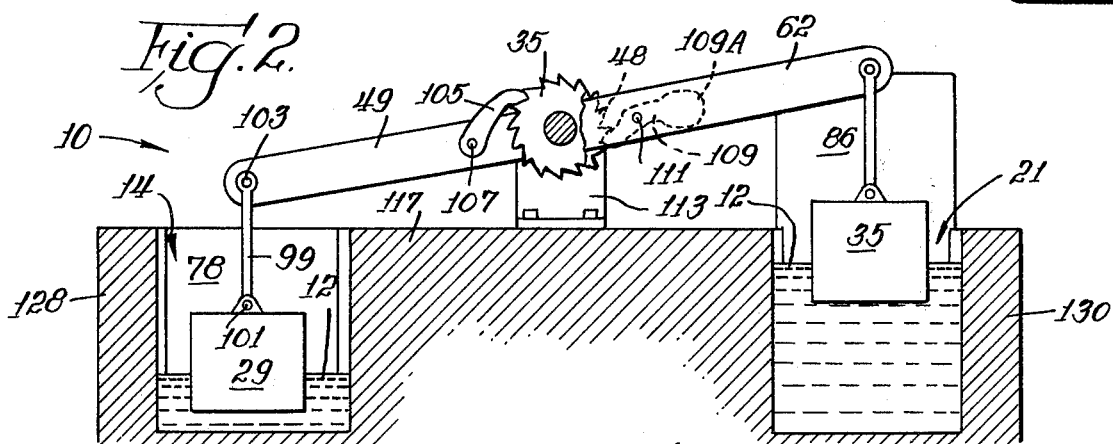
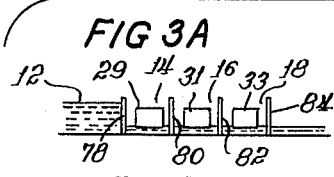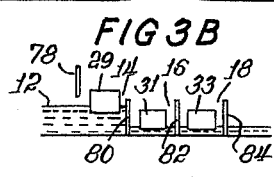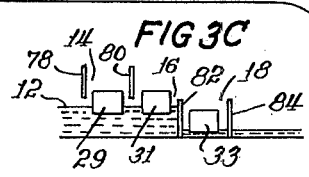
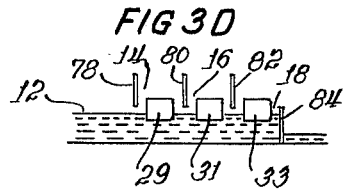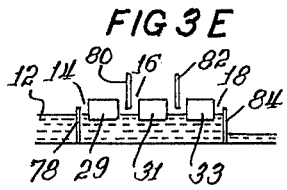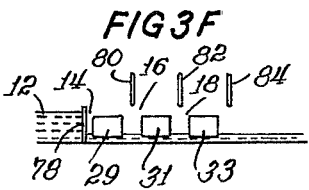

METHOD AND APPARATUS FOR GENERATING POWER

The present invention relates to a method of generating power, and it more particularly relates to a method of generating power from constantly flowing water.

Wave motors have been employed in the past for the purpose of generating hydroelectric power by utilizing the power of the waves of the sea. Floats were moved by the rise and fall of the waves for the purpose of driving a shaft which in turn was used to drive an electrical generator. While wave motors have been successfully employed for some applications, they have not been entirely satisfactory since waves are not at all predictable. At certain times the waves may be so violent and forceful as to cause damage to the wave motor, and at other times the waves may cease or be too gentle as to be ineffectual for driving the wave motor. Moreover, the wave motors had to be extremely sturdily constructed to withstand the force of violent waves. Also, wildly erratic and random waves require that the wave motor include expensive and power-consuming damping devices to smooth the mechanical output power, such devices being unwanted and undesirable.

Wave motors have been disclosed in U.S. Pat. Nos. 366,768; 1,051,974; 1,688,032 and 1,925,742. However, the method and apparatus of the present invention, unlike the methods and equipment disclosed in the foregoing patents, do not rely on waves, tides or other somewhat unpredictable naturally-occurring rising and falling of water to generate power.

Therefore, the princpal object of the present invention is to provide a new method and apparatus for generating power from the sea or other such bodies of water without the necessity of relying on waves, tides or other somewhat unpredictable naturally-occurring rising and falling of water, while at the same time not requiring the consumption of any natural resources.

Briefly, the above and further objects are realized by providing a new and improved method and apparatus, which include providing at least one elongated chamber having a float mounted therewithin for axial and reciprocative movement and having an inlet and an outlet opening into the chamber, and disposing vertically the chamber in an intermediate portion of a constantly downwardly flowing body of water from an upper-elevational portion thereof to a lower-elevational portion thereof. The inlet is positioned in fluid communication with the upstream flow of the water, and the outlet is positioned in fluid communicaton with the downstream fow of the water. The flow of the body of water is alternatingly interrupted and permitted to flow through the chamber to cause the float to be carried by the water in the chamber reciprocatively upwardy and downwardly. The reciprocative movement of the float is utilized to perform useful work.

The above, and stll further highly important objects and advantages of the invention will become apparent from the following detailed specification, appended claims, and attached drawings, wherein:

FIG. 1 is a fragmentary plan view of power generating apparatus which is adapted to be operated in accordance with the present invention;

FIG. 2 is an enlarged fragmentary cross-sectional view of the apparatus of FIG. 1 taken substantially along the line 2—2 thereof;

FIG. 3 is a schematic diagram drawing of the operation of the apparatus of FIG. 1 in accordance with the present invention;

Figure 4:
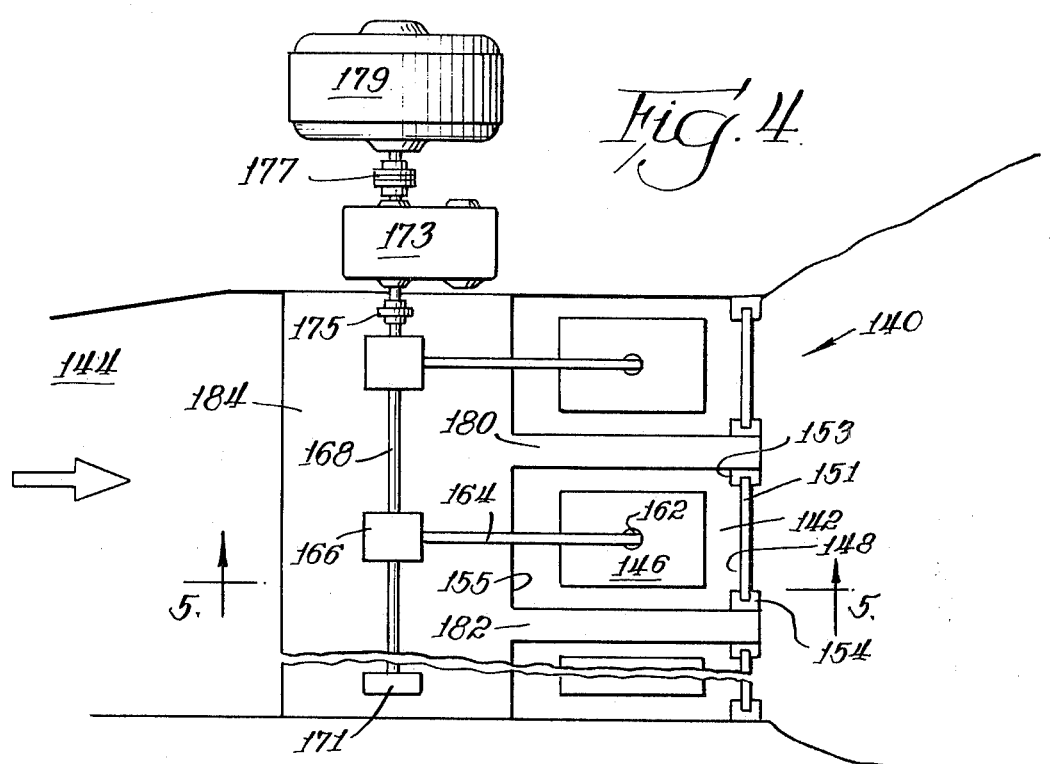
FIG. 4 is a fragmentary plan view of another power generating apparatus which may be operated in accordance with the present invention.

Referring now to the drawings, and more particularly to FIGS. 1, 2 and 3 thereof, there is shown power generating apparatus 10 which is disposed in an intermediate portion of a constantly downwardly flowing body of water from an upper-elevational portion thereof at the left-hand portion of FIG. 1 to a lower-elevational portion thereof at the right-hand portion of FIG. 1, the apparatus 10 being constructed in accordance with the present invention. The constantly flowing body of water may be a waterfall or a portion of a canal, river, dock or any other downwardly flowing body of water suitable to serve as a lock. The power generating apparatus 10 generally includes a series of three chambers 14, 16 and 18 disposed side-by-side in the direction of motion of the water 12, and a second series of three chambers 21, 22 and 23 disposed in a side-by-side arrangement in the direction of flow of the body of water 12 extending parallel to and opposite from the first-mentioned chambers. The first set of three chambers have mounted therein a set of three floats or weights 29, 31 and 33, respectively, for axial and reciprocative movement therewithin as hereinafter described in greater detail. Similarly, the other set of three chambers 21, 23 and 25 include a set of three floats or weights 35, 37 and 39 mounted therewithin for axial and reciprocative movement as hereinafter described in greater detail. A set of three arms 49, 51 and 53 connected through the respective ratchets 55, 57 and 59 drive a shaft 60 which extends in the direction of flow of the water 12 and disposed in an equally spaced-apart manner from the two sets of three chambers. Similarly, arms 62, 64 and 66 connected through respective ratchets 68, 70 and 72 also serve to drive the power shaft 60. A power utilizing means, such as an electrical generator 74 is connected through a speed-increasing gear box 96 to the power shaft 60.

In order to move the floats in the chambers reciprocatively, the chambers of the apparatus 10 are disposed in a vertical manner and receive the water 12 flowing therethrough, and the flow is alternatingly interrupted and permitted so as to cause the water to rise and fall alternatingly within the chambers for causing the floats to rise and fall reciprocatively therein. Thus, the reciprocative movement of the weights applies forces to the outer ends of the arms to drive the shaft 60 rotatably by means of the ratchets connected to the inner ends of the arms as hereinafter described in greater detail. For the purpose of alternatingly interrupting and permitting the flow of water through the chambers, as shown in FIG. 1, a series of four vertically-disposed gates 78, 80, 82 and 84 for the three chambers 14, 16 and 18, respectively, and a series of four vertically-disposed gates 86, 88, 90 and 92 for the other chambers 21, 23 and 25 serve to alternatingly block and open the inlets and outlets of the chambers, such as the inlet 93 and the outlet 95 of the chamber 14. In order to open and close the gates, a suitable mechanism (not shown), such as a pulley mechanism may be employed, and a control and sequencing mechanism (not shown) may be employed to drive the pulleys for opening and closing the gates. The arms 49, 51 and 53 on one side of the shaft 60 may be positioned diametrically opposed to the corresponding other arm 62, 64 and 66 on the other side of the shaft 60 to provide for a uniform distribution of power to the shaft 60, as best seen in FIG. 2 of the drawings. For example, as shown in FIG. 2, the weight 29 in the chamber 14 may be in a lower position when the water is flowing out of the outlet 95 with the gate 80 opened, and the float 35 in the chamber 21 is rising due to the water flowing into the chamber 21 due to the opening of the gate 86, the opening and closing of the gates being timed such that the arm 49 remains at all times substantially diametrically opposed from the arm 62 as they move up and down reciprocatively. The two sets of oppositely-disposed chambers are thus operated so that their arms are diametrically-opposed substantially at all times, and in this regard, the arms 51 and 64 and the arms 55 and 66 remain diametrically-opposed in a similar manner as the arms 49 and 62 as shown in FIG. 2.

Considering now the operation of one of the rows of chambers with reference to FIG. 3 of the drawings, only the chambers 14, 16 and 18 will now be described, since the operation of the other row of chambers 21, 23 and 25 operate in a similar manner. As shown in FIG. 3A, assuming that the three floats 29, 31 and 33 are initially in their lowermost position, the four gates 78, 80, 82 and 84 are in their lowermost position with the water level in the three chambers 14, 16 and 18 in their lowest position, the water level upstream of the gate 78 being at an elevated level. With the three floats in their lower position, they are prepared to drive the shaft 60 via their arms and ratchets so that the generator 74 may be driven via the gear box 76.

In order to provide a smooth driving torque for the shaft 60, the floats are raised seriatum. As shown in FIG. 3B, the gate 78 is then raised to permit the water 12 to enter the chamber 14. The water then rises in the chamber 14 to the level of the water 12 upstream from the chamber 14 to carry the weight 29 into its upper position. As shown in FIG. 3C, the gate 80 is then raised to its upper position to permit the water to flow into the chamber 16 to raise the float 31. The water in the chamber 16 then rises to the level of the body of water upstream therefrom. Similarly, as shown in FIG. 3D, the gate 33 is raised to its upper position to cause the chamber 18 to fill with water, thereby raising the float 33 to its upper position.

As shown in FIG. 3E, in order to prepare for the next cycle of operation, the gate 78 is lowered to close the inlet 93 for the chamber 29. Thereafter, as shown in FIG. 3F, the floats 29, 31 and 33 are lowered by permitting water to be drained from the three chambers. The three gates 80, 82 and 84 are raised to their uppermost position to permit the water to flow downstream from the three chambers 14, 16 and 18. Thereafter, the cycle may be repeated to continue the driving of the shaft 60.

Considering now the apparatus 10 in greater detail with reference to FIGS. 1 and 2 of the drawings, the floats, arms and ratchets will now be considered in greater detail, and since they are all similar to one another, the float 29, the arm 49 and the ratchet 35 of FIG. 2 will now be described. A vertical link 99 is pivotally connected at 101 to the float 29, and the upper end of the link 99 is pivotally connected at 103 to the outer end of the arm 49, the opposite end of which being freely rotatable about the shaft 60. A pawl 105 is pivotally connected at 107 to the inner end portion of the arm 49 to engage the teeth of the ratchet 35 to drive it in a clockwise direction as viewed in FIG. 2. When the weight 29 falls within the chamber 14, the pawl 105 is carried by the arm 49 and retracts from one tooth and falls under the force of gravity into engagement with the next lower adjacent tooth of the ratchet 35. The arms and ratchets of the chambers 21, 23 and 25 are generally similar to the arms and ratchets of the chambers 14, 16 and 18, except that the pawls, such as the pawl 109 pivotally mounted at 111 to the arm 62, includes counter-weights, such as the counter-weight 109A of the pawl 109, to cause them to re-engage the next adjacent lower tooth of their ratchets, such as the ratchet 48, when the weights, such as the weight 35 moves downwardly.

The shaft 60, as best seen in FIG. 1, is journaled for rotation at its opposite ends by a pair of spaced-apart bearings 113 and 115 which are positioned on a support block 117 preferably composed of concrete. A coupling 119 connects the end of the shaft 60 at the bearing 113 to the gear box 76, and a coupling 122 connects the output of the gear box 76 to the input to the generator 74. In order to divert a portion of the flowing water 12 to the apparatus 10, a weir 124 extends across the flow of water from one bank 126 to a wall 128 which extends in the direction of the flow of the water 12, and which serves as a common wall for the three chambers 14, 16 and 18. The opposite bank 130 serves as a common wall for the chambers 21, 23 and 25. The chambers are of a similar construction, and thus only the chamber 14 will now be described in greater detail. The chamber 14 is defined on one side by the block 117 and on the other side by the wall 128, the gates 78 and 80 defining the other ends of the generally rectangular cross-sectional shaped chamber 14. Each one of the gates, such as the gate 78, is generally rectangular in shape and is slidably supported by a pair of tracks, such as the track 132 mounted in a vertical position on the block 117 and the track 134 mounted opposite the track 132 on the wall 128.

Figure 5:
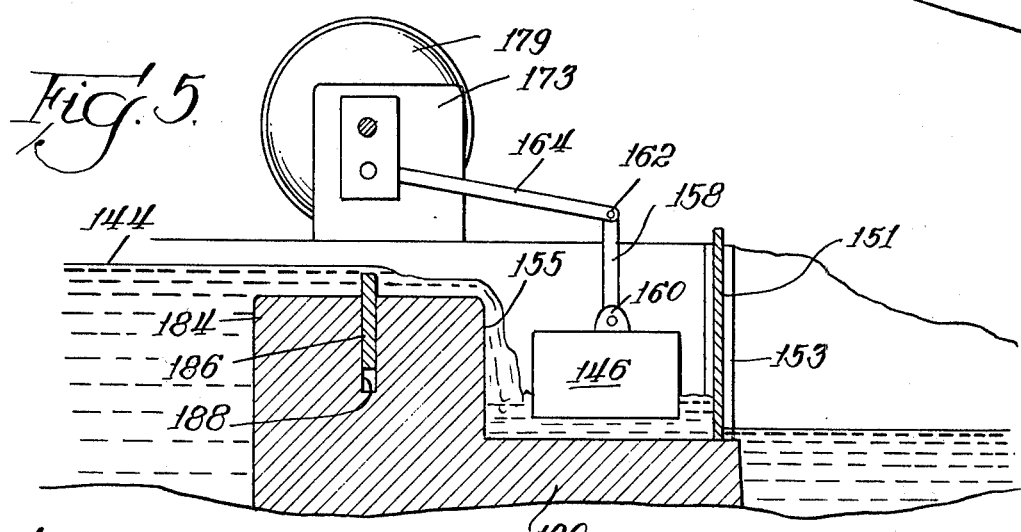
FIG. 5 is a cross-sectional view of the apparatus of FIG. 4 taken substantially along the line 5—5 thereof.

Considering now a power generating apparatus 140 of FIGS. 4 and 5 of the drawings, the power generating apparatus 140 is also constructed in accordance with the principles of the present invention, and is similar to the apparatus 10, except that the apparatus 140 has its chambers disposed in a side-by-side manner across the flow of water. Also, unlike the apparatus 10, the apparatus 140 drives the power shaft during both the up and down movement of the floats. Also, no gates are provided for the inlets to the chambers of the apparatus 140. The apparatus 140 includes a series of vertically-disposed chambers, such as a chamber 142, extending across the flow of water 144 from an upper elevation to a lower elevation. Each one of the chambers, such as the chamber 142, confines a float, such as a float 146 in the chamber 142, for moving reciprocatively upwardly and downwardly as water rises and falls within the chambers in a similar manner as the chambers of the apparatus 10. Each one of the chambers, such as the chamber 142, includes an outlet, such as the outlet 148 of the chamber 142, on the downstream side of the flow of water 144. A vertically-disposed gate 151 is adapted to close the outlet 148 and is slidably mounted between a pair of tracks 153 and 155 in a similar manner as the apparatus 10 of FIG. 1. Each one of the chambers, such as the chamber 142, includes an inlet, such as the inlet 155 of the chamber 142, for continuously receiving in an unimpeded manner the water 144 flowing into the chamber 142. The inlet is the open top portion of the chamber 142. The water 144 enters the chamber 142 via its open inlet 155 to fill the interior of the chamber 142 when the gate 151 is closed. In order to substantially empty the chamber 142 and thus to lower the float 146, the gate 151 is raised to its upper position to permit the water to flow downstream from the interior of the chamber 142.

Each one of the chambers of the apparatus 140 are similar to one another, and therefore only the chamber 142 will now be described. A link 158 is pivotally connected at its lower end at 160 to the float 146, and the upper end of the link 158 is pivotally connected at 162 to an outer end of an arm 164. A ratchet mechanism generally indicated at 166 is driven by the inner end of the arm 164 to drive a shaft 168 extending transverse to the flow of water 144 when the float 146 moves both upwardly and downwardly as hereinafter described in greater detail. A bearing 171 journals the shaft 168 for rotation at one of its ends, and a speed-up gear box 173 is connected at its opposite end via a coupling 175 to rotatably support the opposite end of the shaft 168. A coupling 177 connects the output of the gear box 173 to a utilizing means, such as an electrical generator 179.

Considering once again the chamber 142, the chamber 142 is defined by a pair of oppositely-opposed spaced-apart walls 180 and 182 extending in the direction of the flow of the water 144, the tracks 153 and 154 being mounted on the respective walls 180 and 182 to support the gate 151 which define one of the ends of the chamber 142, the opposite end of the chamber being defined by a common wall 184 extending transversely to the flow of water 144 and serving as an upstream end wall for all of the chambers. A vertically movable weir 186 is slidably mounted in an open groove or slot 188 in the upper face of the wall 184 to adjust the flow of water into the inlets of the chambers since the water 144 may be of differeent heights depending upon the current weather conditions. Also, it is important to adjust the flow of water into the chambers relative to the sizes of the outlets of the chambers. A common floor 190 for the chambers is integral with and extends from the common wall 184.

Figure 6:
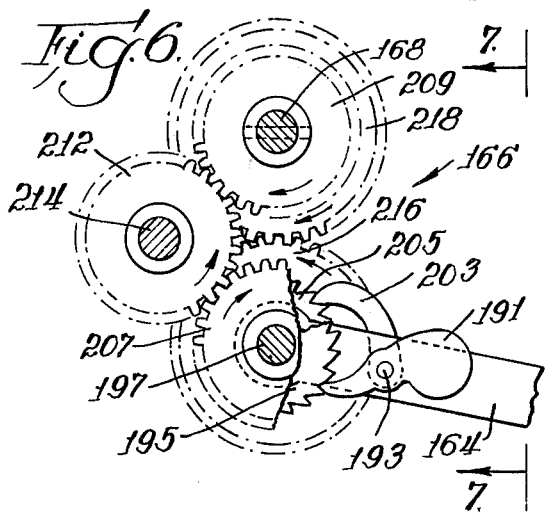
FIG. 6 is an enlarged, fragmentary, partially-broken away elevational view of one of the ratchet mechanisms for the apparatus of FIG. 4.
Figure 7:
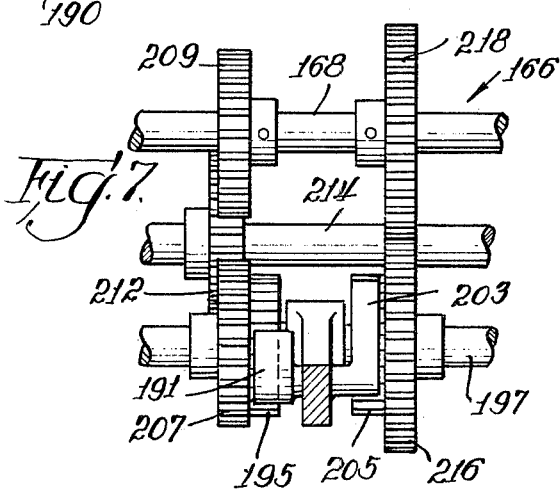
FIG. 7 is a fragmentary cross-sectional view of the mechanism of FIG. 6 taken substantially along the line 7—7 thereof.

Considering now the ratchet mechanisms in greater detail with reference to FIGS. 6 and 7 of the drawings, each one of the ratchet mechanisms are similar to one another, and therefore only the mechanism 166 will now be described. The mechanism 166 causes the shaft 168 to be drivin in both the upward and downward movement of the float 146 and thus during both the clockwise and counterclockwise movement of the arm 164 as viewed in FIG. 6. Counterweighted pawl 191 is pivotally connected at 193 to the outer end of the arm 164 to engage a ratchet 195 freely rotatable about a jackshaft 197. The pawl 191 drives the ratchet 195 during the counterclockwise movement of the arm 164 as viewed in FIG. 6. A second pawl 203 is pivotally mounted at 193 on the opposite side of the arm 164 to drive a ratchet 205 freely rotatably mounted on the jackshaft 197 during the counterclockwise movement of the arm 164. A gear 107 fixed to the ratchet 195 drives a gear 209 pinned to the shaft 168 via an idler gear 212 on a jackshaft 214. A gear 216 fixed to the ratchet 205 drives a gear 218 pinned to the output shaft 168 so that both gears 209 and 218 drive the shaft 168 in the same direction. As a result, the two pawls 191 and 203 drive their ratchets 195 and 205, respectively, during the respective clockwise and counterclockwise movement of the arm 164, the gear 216 directly driving the gear 218 fixed to the shaft 168 and the gear 207 driving the gear 209 via the direction changing idler gear 212. Therefore, the arm 164 drives the shaft 168 continuously during both its clockwise and counterclockwise pivotal movement as its outer end is moved upwardly and downwardly by the float 146 and its inner end is freely rotatable about the shaft 197.

While the present invention has been described in connection with particular embodiments thereof, it will be understood that many changes and modifications of this invention may be made by those skilled in the art without departing from the true spirit and scope thereof. For example, instead of employing gates, valves might also be employed to control the flow of fluid into and out of the chambers. Accordingly, the appended claims are intended to cover all such changes and modifications as fall within the true spirit and scope of the present invention.

What is claimed is:

1. A method of generating power comprising the steps of:

providing a plurality of elongated chambers each having an open top and each having a float mounted therewithin for axial and reciprocative movement with an inlet and an outlet communicating with the interior of said chambers;

disposing vertically said chambers in an intermediate portion of a constantly downwardly flowing body of water from an upperelevational portion thereof to a lower elevational portion thereof with their inlets and outlets communicating with said water;

positioning said inlets in fluid communication with the upstream flow of said water and positioning said outlets in fluid communication with the downstream flow of said water;

arranging said chambers substantially in a common plane;

alternatingly interrupting and permitting the flow of said body of water in said inlets through said chambers and out said outlets to cause their floats to be carried by said water in said chambers reciprocatively upwardly and downwardly within said chambers, said interrupting causing water to rise in said chambers and said permitting causing water to fall in said chambers;

providing ratchet means;

extending at least partially said ratchet means through the open tops of said chambers and connecting mechanically said ratchet means and said floats;

utilizing the thus caused reciprocative movement of said floats via said ratchet means;

disposing vertically the chambers in said intermediate portion of said flowing body of water in a side-by-side arrangement with the first mentioned chamber and extending in the direction of flow of said flowing body of water; and positioning the inlets of said chambers in fluid communication with the upstream flow of said water via adjacent outlets of the adjacent chambers so that the inlets are upstream of the outlets.

2. A method according to claim 1, further including permitting said water to fill all of said chambers, subsequently opening the outlet of the furthermost downstream chamber to permit water to exit therefrom, thereby permitting its float to fall to a lower level within the opened chamber.

3. A method according to claim 2, subsequently opening the outlets of the next upstream chambers seriatum so that the cycle may be repeated after the outlet of the furthermost upstream chamber is opened.

4. A method according to claim 3, further including providing a second series of side-by-side chambers having communicating inlets and outlets and positioning them in a row in the direction of flow of said water, the chambers of said second series of chambers being substantially similar to the first-mentioned chambers.

5. A method according to claim 1, providing utilizing means including an arm connected pivotally to at least one of said floats and a rotatably mounted power shaft, said ratchet means being driven by said arm and fixed to said shaft for driving rotatably said shaft, said ratchet means including a pair of pawls carried by said arm, one set of gears for drivingly coupling one of said pawls to said shaft, a second set of gears for drivingly coupling the other one of said pawls to said shaft, said second set of gears including an idler gear to enable said arm to drive said shaft during both the up and the down movement of the last-mentioned float and said arm.

6. A method of generating power comprising the steps of:

providing a plurality of elongated chambers each having an open top and each having a float mounted therewithin for axial and reciprocative movement with an inlet and an outlet communicating with the interior of said chambers;

disposing vertically said chambers in an intermediate portion of a constantly downwardly flowing body of water from an upper-elevational portion thereof to a lower elevational portion thereof with their inlets and outlets communicating with said water;

positioning said inlets in fluid communication with the upstream flow of said water and positioning said outlets in fluid communication with the downstream flow of said water;

arranging said chambers substantially in a common plane;

alternatingly interrupting and permitting the flow of said body of water in said inlets through said chambers and out said outlets to cause their floats to be carried by said water in said chambers reciprocatively upwardly and downwardly within said chambers, said interrupting causing water to rise in said chambers and said permitting causing water to fall in said chambers;

providing ratchet means;

extending at least partially said ratchet means through the open tops of said chambers and connecting mechanically said ratchet means and said floats;

utilizing the thus caused reciprocative movement of said floats via said ratchet means; and a plurality of other similar chambers and positioning all of said chambers in a row transversely to said flow of said water, said chambers having inlets and outlets, said inlets being an open end portion of said chamber, guiding uninterruptedly said flow of said water into the interiors of said chambers via their inlets, said interrupting and said permitting occurring at said outlets.

* * * * *